(12) United States Patent
McElroy et al.

(10) Patent No.: US 8,624,154 B2
(45) Date of Patent: Jan. 7, 2014

(54) LASER MARKING SYSTEM

(75) Inventors: Eric R. McElroy, Grove City, PA (US); Todd L. Hockenberry, Orlando, FL (US); David M. Sweet, Wexford, PA (US)

(73) Assignee: Mecco Partners, LLC

( * ) Notice: Subject to any disclaimer, the term of this patent is extended or adjusted under 35 U.S.C. 154(b) by 1119 days.

(21) Appl. No.: 12/381,713

(22) Filed: Mar. 16, 2009

(65) Prior Publication Data
US 2009/0179016 A1 Jul. 16, 2009

Related U.S. Application Data

(63) Continuation of application No. 11/676,778, filed on Feb. 20, 2007, now abandoned.

(60) Provisional application No. 60/775,558, filed on Feb. 22, 2006.

(51) Int. Cl.
*B23K 26/00* (2006.01)
*B23K 26/12* (2006.01)
*B23K 26/16* (2006.01)
*B23K 26/36* (2006.01)

(52) U.S. Cl.
USPC ............. 219/121.68; 219/121.86; 250/492.1; 347/224; 347/263

(58) Field of Classification Search
USPC ............. 219/121.61–121.72, 121.83, 121.86; 250/492.1; 347/224, 263; 101/3.1, 494; 156/272.8; 430/4, 292, 333, 346; 601/7
See application file for complete search history.

(56) References Cited

U.S. PATENT DOCUMENTS

| | | | |
|---|---|---|---|
| 4,080,526 A * | 3/1978 | Kihara et al. | 219/121.22 |
| 4,541,055 A * | 9/1985 | Wolfe et al. | 700/166 |
| 5,298,717 A | 3/1994 | De Rossett, Jr. | |
| 5,424,508 A * | 6/1995 | Swain et al. | 219/121.84 |

FOREIGN PATENT DOCUMENTS

JP  04055071 A  *  2/1992

OTHER PUBLICATIONS

Office Action dated Jul. 16, 2013 issued by the Canadian Intellectual Property Office in Canadian application No. 2646382, which is a counterpart to the present application.

* cited by examiner

*Primary Examiner* — Samuel M Heinrich
(74) *Attorney, Agent, or Firm* — Keevican Weiss Bauerle & Hirsch; Michael G. Monyok; Andrew J. Cornelius

(57) ABSTRACT

The present invention is directed to a laser marking device, system and method for its use.

13 Claims, 14 Drawing Sheets

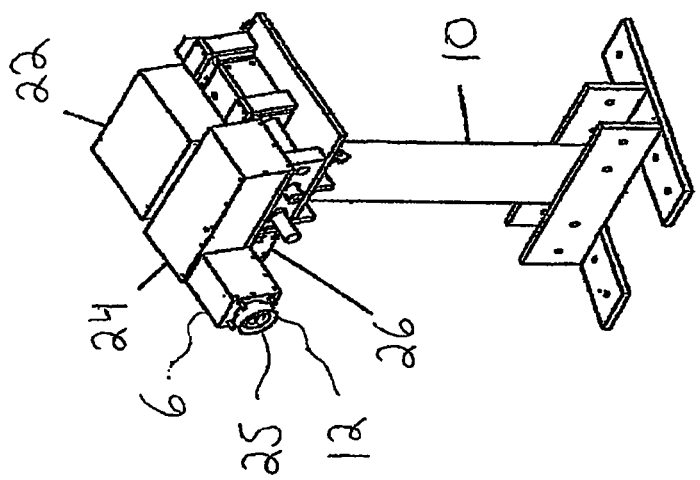
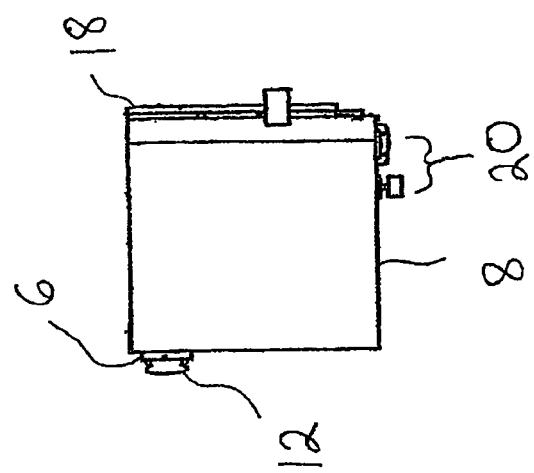

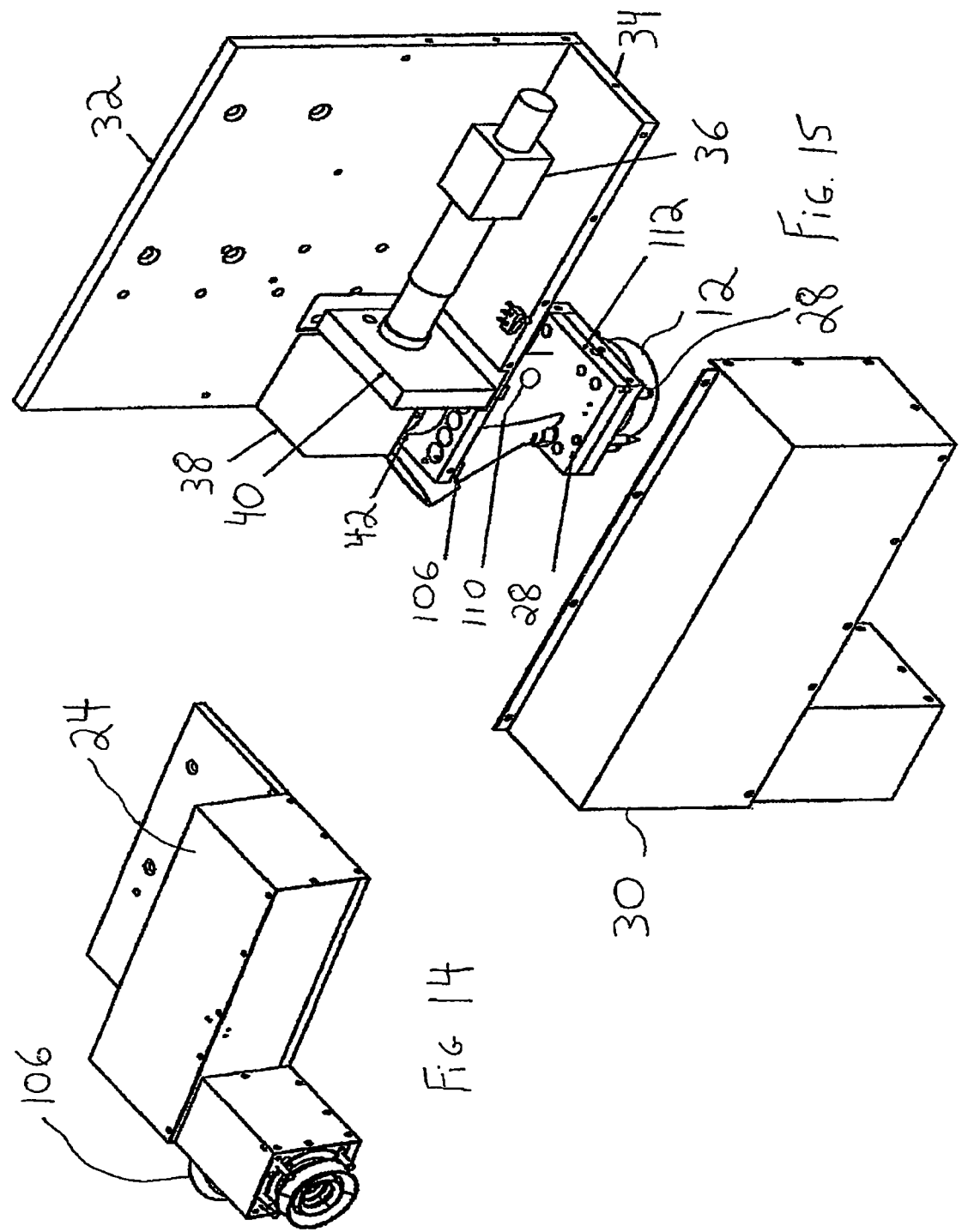

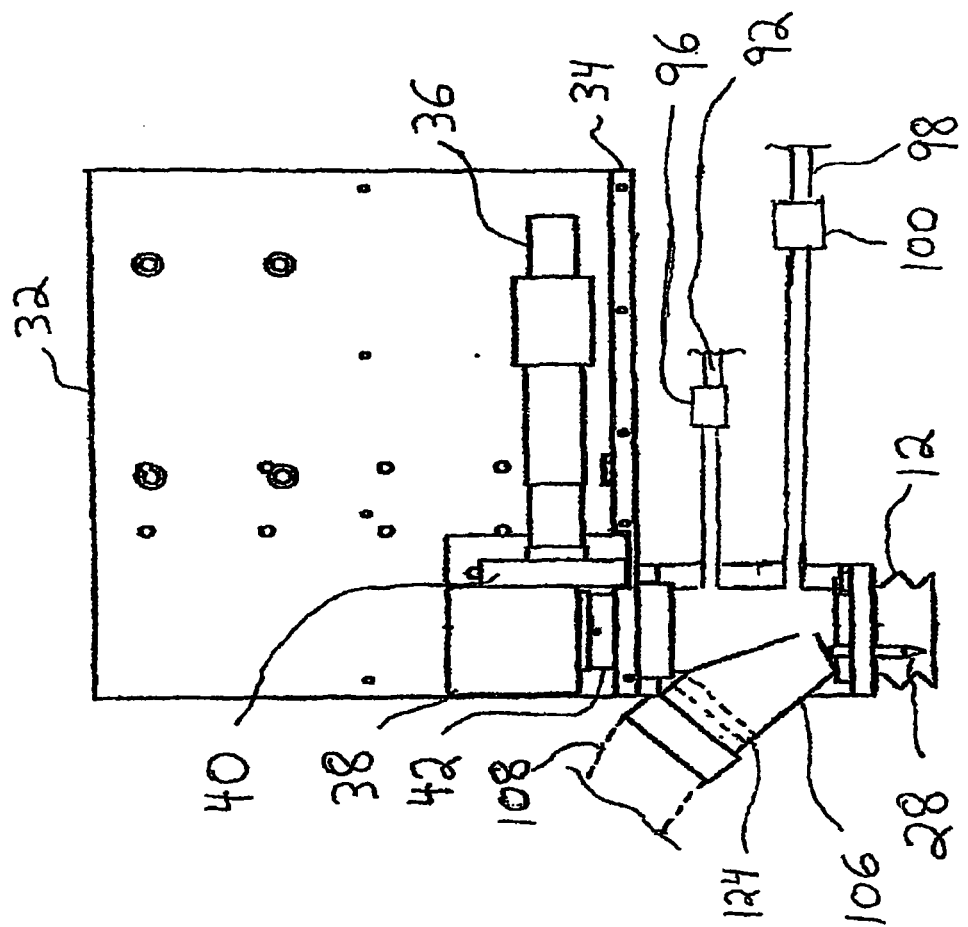

LASER MARKING SYSTEM

CROSS REFERENCES TO RELATED APPLICATIONS

The present application is a continuation of U.S. Nonprovisional patent application Ser. No. 11/676,778, filed Feb. 20, 2007, now abandoned, which claims the benefit under 35 USC 119(e) of U.S. Provisional Patent Application Ser. No. 60/775,558 filed Feb. 22, 2006 entitled "Laser Marking System" filed in the name of Eric McElroy et al, now expired.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A SEQUENCE LISTING OR OTHER MATERIALS

Not applicable.

BACKGROUND OF THE INVENTION

1. Field of the Invention

The present invention is directed to a laser marking device, system and method for its use.

2. Description of the Related Art

Laser marking systems have been known in the art.

One challenge with such devices and/or systems is to know when the part to be marked is properly positioned before the marking head, and that the part or other item to be marked is not deformed or otherwise compromised.

Another challenge is preventing the laser light from escaping a confined marking space. This is undesirable because it can lead to marking surfaces that were not intended to be marked and/or to damaging other surfaces with such stray light. There are standards set for such devices by the Center For Device and Radiological Health ("CDRH") and one such standard is known as a "Class 1" environment. Traditionally, protecting the area to meet the CDRH's Class 1 laser safety specification has required extensive guarding, part fixturing/handling and moving doors to allow parts or other items to be marked, to index in and out of the laser area. In many applications, to meet this standard required large contained areas (also known as "footprint(s)") around the part or other item to be marked in order to properly mark the part or item and to protect the user/operator from laser radiation. Meeting this standard often consumed much valuable floor space/area and can be costly component of the device.

And attempts to meet this standard while minimizing floor space have lead to systems that are arguably in some instances not safe for production environments. For example, some systems may utilize only 2 sensors to detect the item or device to be marked and do not verify part integrity, light seal and/or material presence. Also, such systems are often used in or as hand held devices where the operator has to wear protective eyewear and/or other protective clothing and place shielding, such as laser safe curtains around the marking area.

Attempts have been made to address some of these problems, but the resulting systems and devices have been either complex and unwieldy or very costly to manufacture, and in some cases, such devices and/or systems have proven to be unreliable. Reliability has been a particularly difficult challenge where the laser marking device is utilized in a manufacturing or similar environment, where the demands on the device can be very harsh indeed.

Thus there remains a need in the art for a laser marking device, system and method, which can reliably function in harsh environments and ensure accurate marking of the part or other item, which can tell when such part or other item is damaged or otherwise corrupted and/or when such part or item is not properly positioned for marking so that corrective steps can be taken, and which prevents the escape of light from the confined marking space, and which can be conveniently manufactured and is not unwieldy to operate or repair. There remains a particular need for a device providing these advantages in a minimal footprint area.

BRIEF SUMMARY OF THE INVENTION

The inventors have met these needs with a novel laser marking device of the present invention.

In terms of function and capability, the novel device of the present invention contains the marking laser light within a confined marking chamber. In a preferred embodiment, it can meet or exceed a CDRH Class 1 rating for laser safety for production laser marking/engraving. And it accomplishes this in a minimal footprint area, with lower overall cost, less integration and assembly time for the end user, and with a system and device that is easy to integrate into existing automation, e.g. in to existing assembly lines or plants.

In terms of design, the present invention utilizes a unique combination of sensing devices and an enclosure system which includes at least one vacuum chamber and at least one marking chamber, wherein at least a portion of at least one surface of the part being marked forms at least one side of the enclosure. The laser marking system and device of the present invention, among other advantages: 1) eliminates the possibility that a damaged part, improperly located part or a part with an undesirable hole or other deformation will be marked, thus also eliminating undesirable exposure of the surroundings to stray laser radiation; 2) eliminates the possibility of accidental marking of materials of the type not intended to be marked, for example, if metallic parts were intended to be marked, non-metallic parts such as glass or human body parts will not be marked, conversely if the material intended to be marked is plastic, metal surfaces will not be marked, etc.; and 3) eliminates the possibility that a part not fully seated and sealed is marked, thus again, also eliminating undesirable exposure of the surroundings to stray laser radiation.

More particularly, in terms of design, the present invention utilizes a snorkel-like assembly, referred to hereinafter as a safety seal assembly as described in more detail below. The safety seal assembly operates in combination with a laser to mark the part. The safety seal assembly in combination with the part or other item to be marked, forms a compact enclosure that in a preferred embodiment meets a CDRH Class 1 rated enclosure. The device of the present invention encloses the area in which the lasing process occurs. And importantly, it utilizes at least a portion of at least one surface of the part being marked as the one of the sides of the enclosure (which enclosure includes at least one vacuum chamber and at least one marking chamber as described more fully herein). In operation, once the safety seal assembly engages the part it draws a vacuum and seals itself to the part to form the enclosure. Proper safety mechanisms listed below verify and maintain the integrity of the seal throughout the laser marking process. The laser marking system and device of the present invention takes up minimal floor space and is a cost effective solution for laser integration and marking.

The laser marking system and device of the present invention permits marking of metallic parts, non-metallic parts and combinations thereof. Examples of metallic parts include but are not limited to aluminum, steel, ferrous materials and other metallic parts. Examples of non-metallic parts include plastic, rubber, ceramic or any other material that can be marked with laser light. Even parts having glass surfaces, which usually simply transmit laser radiation therethrough, can be marked provided a backstop or other laser absorbing material is used to prevent transmission of the laser light through the part to be marked.

These parts to be marked can be, among other things, cast, forged, extruded or assembled. And the laser marking system and device of the present invention can be integrated into most every manufacturing and assembly process including but not limited to machining, welding, turning, tempering and bending processes, to name but a few.

BRIEF DESCRIPTION OF THE SEVERAL VIEWS OF THE DRAWINGS

FIG. 7 is a top plan view of the laser marking system and device of FIG. 3.

FIG. 8 is a perspective view of the laser marking system and device of FIG. 3 illustrating removal of the cover to show one embodiment of the internal components of the device.

FIG. 14 is a perspective view of an alternative rail assembly of the present invention illustrating a y-shaped laser tube.

FIG. 15 is perspective view of the rail assembly of FIG. 14 illustrating removal of the cover.

FIG. 20 is a top plan view similar to that of FIG. 19, but illustrating an alternative embodiment where a vacuum is drawn in the marking chamber but with the elimination of a fume suction line.

DETAILED DESCRIPTION OF THE INVENTION

Figure 1:
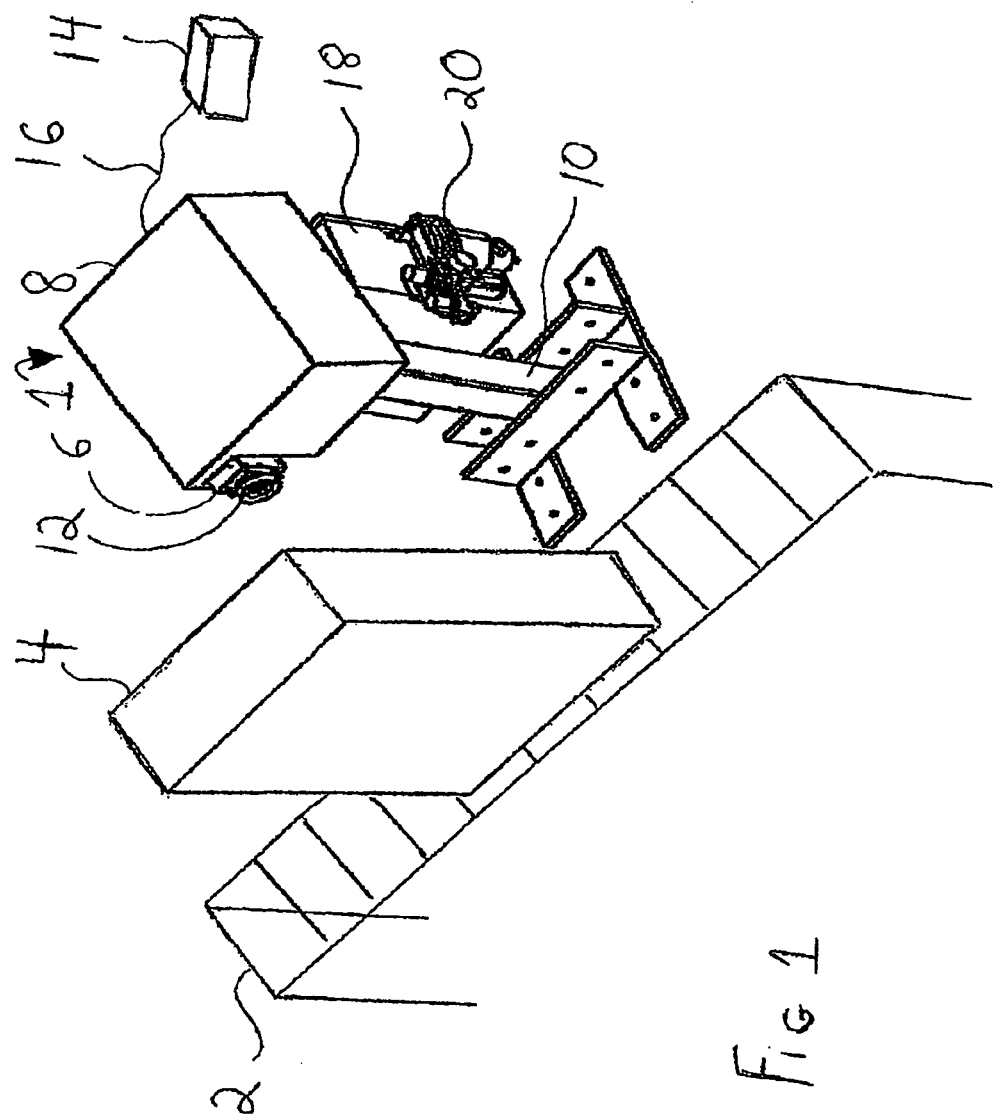
FIG. 1 is a perspective view of one embodiment of the laser marking system and device of the present invention illustrating the device in spaced apart relationship from a part to be marked.

As used herein, all numbers, such as but not limited to dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.5, 5.5 to 10, 2.3 to 7.3, etc. All references and publications referred to herein, such as but not limited to U.S. patents and published applications, are to be understood as being herein incorporated by reference in their entirety. Unless otherwise clear from the context, like reference characters identify like parts throughout.

For purposes of description hereunder, the terms "upper", "lower", "right", "left", "vertical", "horizontal", "top", "bottom", "front", "rear" or "back" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not considered as limiting.

In the context of the present invention, the laser marking system will be used to mark a part or item or other material with a laser to provide such part with identifying or other marks. As may be appreciated, the item being marked is not limiting to the invention, and can be any item or surface where it is desired to place a laser marking. The part or item may be a part for incorporation into another device, as for example a transmission casing to be included in the manufacture of an automobile, or may itself be the final end product that is to be used, sold or otherwise distributed to an end user.

Also, as may be appreciated, neither are the markings being made limiting to the present invention, which may be, among other types of marks for example, serial number markings, bar code markings, alpha, numeric and/or alpha-numeric markings, graphical markings and combinations thereof to name but a few.

But to repeat these concepts repeatedly throughout the following discussion will be unwieldy. Therefore, in the following discussion, unless otherwise clear from the context, for the sake of convenience the item being marked will be referred to as a "part" and the laser marking being made on the part will be referred simply as the "mark", but it is to be understood that these terms are being used only for convenience of discussion and refer to the broader concepts just described.

Figure 2:
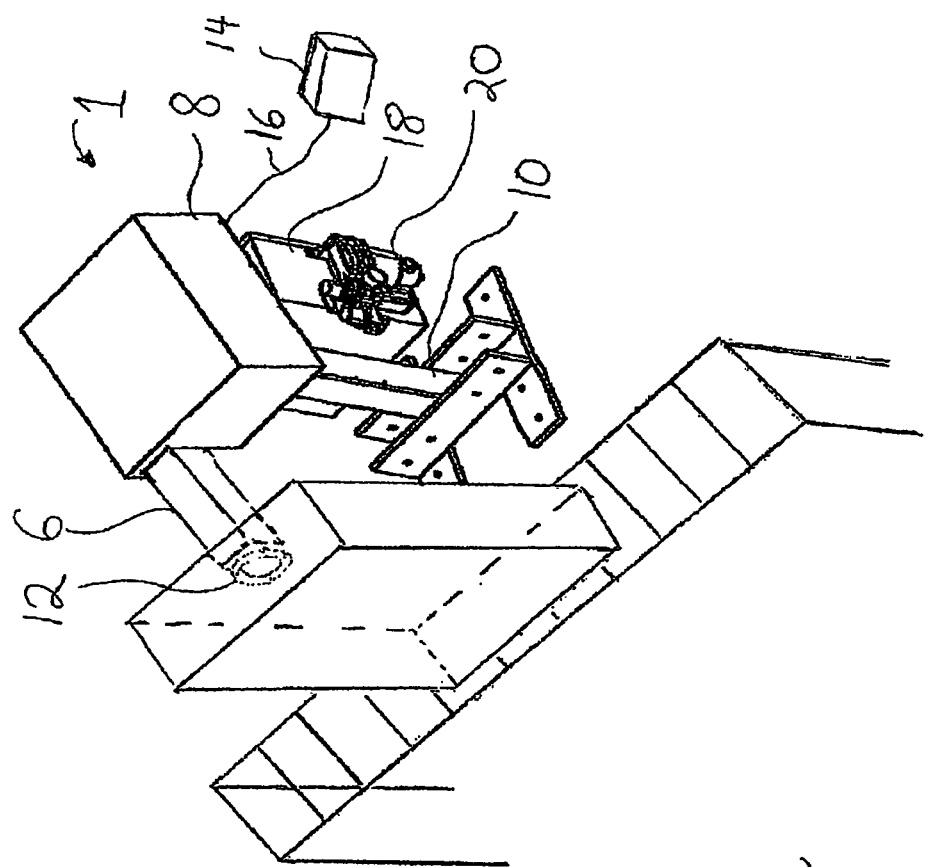
FIG. 2 is a perspective view of the laser marking system and device of FIG. 1 illustrating the device sealed against a part to be marked.

Referring now to FIGS. 1 and 2 there is illustrated a perspective view of the laser marking system and device 1 of the present invention, illustrating the device as it might be used along side an optional conveyer 2 such as, but not limited to, an assembly line. The present invention may be used to mark stationary objects as well, and the conveyer 2 optional, but is being used here for illustrative purposes.

As shown in FIG. 1, when a part 4 on which a laser mark is desired, is moved along the conveyer 2 to a position in front of the laser marking system and device 1 of the present invention, the part 4 is stopped in front of a safety seal assembly 6. The safety seal assembly 6 includes several components as described below, and the safety seal assembly 6 is only one of the components under the cover 8 of the laser marking system and device 1. The additional components under the cover 8 are described in more detail below, and in a preferred embodiment, a stand 10 may be utilized to hold these and other components as described more fully below. But for the immediate discussion, focus will be on the safety seal assembly 6, and one of its components, namely sealing head assembly 12 to gain a basic understanding of the present invention.

Turning now to FIG. 2, when the part 4 is in the proper registration for marking, the safety seal assembly 6 is advanced as in shown in FIG. 2 until its sealing head assembly 12 is brought into physical contact with the part 4, whereupon at least a portion of at least one surface of the part 4 forms one side of a vacuum/marking chamber, as explained in more detail below. The vacuum/marking chamber is an enclosure that may be considered to be a single chamber comprised of two component parts, namely a marking chamber and a vacuum chamber or it may be considered to be two separate chambers, but either manner of considering the chambers results in the same design of the present invention. In FIG. 2, that portion of the safety seal assembly 6, in particular the sealing head assembly 12 that is blocked from view by the part 4 is shown in phantom.

As may be appreciated, while FIG. 2 illustrates the safety seal assembly 6 as advancing to the part 4, it is not limiting to the invention which (or both) of the part 4 and the safety seal assembly 6 are moved to cause the two to come in contact with each other, nor is it limiting as to whether this movement is achieved by gravity or by other means such as by electromechanical devices, pneumatically operated devices, hydraulically operated devices or combinations thereof. It is only important that the sealing head assembly 12 of the safety seal assembly 6 is brought into contact with the surface of the part 4 where the marking is to occur. By way of example of other alternatives as within the scope of the present invention, although not illustrated in the figures, the safety seal assembly 6 or the entire laser marking system and device 1 or any number of subcomponents of it might be attached to an arm which might be employed to advance the selected components toward the part 4 to cause the sealing head assembly 12 to make physical contact with the part 4. Such an arm may be employed to allow for movement in the x, y and/or z axis and combinations thereof as described in more detail below.

As illustrated in later drawings, the advancing safety seal assembly 6 may include one or more proximity switches that sense when the safety seal assembly 6 has made contact with the part 4 to stop any further advance of the safety seal assembly 6 and/or to start additional process steps in the process of marking the part 4 with a laser marking.

In addition to the safety seal assembly 6, the laser marking system and device 1 of the present invention also includes a control mechanism 14 for controlling operation of all or a portion of laser marking system and device 1 including its safety seal assembly 6.

Such a control mechanism 14 is not limiting to the present invention so long as it provides the necessary control over the operation of the laser marking system and device 1. Examples include but are not limited to one or more computers and similar devices, and/or one or more programmable logic controllers ("PLCs"). In the following discussion the term "control mechanism" will be used for convenience, but it is to be understood that, unless otherwise clear from the context, it includes computers, PLCs and similar devices and combinations thereof. In a preferred embodiment, the control mechanism 14 is a computer on which is running software that allows the operator of the laser marking system and device 1 to control the laser marking system and device 1, including controlling the operation of the safety seal assembly 6 and in turn the marking that is being made on the part 4, as described herein more fully below.

It is not limiting to the present invention whether the signals from the control mechanism 14 are sent via wire or wirelessly or by other means known in the art to the safety seal assembly 6 and the other components of the laser marking system and device 1, but for illustrative purposes, cable 16 is illustrated in FIGS. 1 and 2 as the means by which the control mechanism 14 controls the safety seal assembly 6 and/or the additional components of the laser marking system and device 1 of the present invention.

As may be seen in FIG. 2, the laser marking system and device 1 of the present invention also includes a vacuum assembly 18 which operates to pull a vacuum in the sealing head assembly 12 which operates to create the vacuum that affixes sealing head assembly 12 against the part 4 being marked via piping or tubing not shown in FIG. 2, but as described in more detail below. The laser marking system and device 1 of the present invention also includes one or more vacuum sensors to measure the vacuum at or about the sealing head assembly 12, to ensure that an adequate vacuum has been obtained. In a preferred embodiment, the vacuum sensor(s) is/are located within the vacuum assembly 16. Also illustrated in FIGS. 1 and 2 is a filter assembly 20 for removing fluid, debris and other materials from any air and/or vacuum lines associated with the present invention.

In operation as may be seen by a comparison of FIGS. 1 and 2, in one embodiment of the present invention, as that portion of the part 4 where the laser mark is desired to be made is brought in front of the safety seal assembly 6, the safety seal assembly 6 is advanced as shown in FIG. 2 and makes physical contact with the part 4. A vacuum is then pulled by the vacuum assembly 18 which vacuum is transferred to the sealing head assembly 12, causing the sealing head assembly 12 to seal with a vacuum against the part 4 as explained in more detail below. The vacuum sensor(s) confirm the presence of an adequate vacuum, which then authorizes the safety seal assembly 6 to make the desired mark on the part 4.

As may be appreciated and as will be explained more fully below, at least a portion of at least one surface of the part 4 being marked forms one of the sides of the vacuum chamber, with the sealing head assembly 12 described in more detail below, providing the remaining sides of the vacuum chamber, also as discussed in more detail below. Also, as may be appreciated, at least a portion of at least one surface of the part 4 also forms one side of the laser marking chamber. As may be appreciated, if safety seal assembly 6 is unable for any reason to form the required vacuum in the vacuum chamber and, optionally, also form a vacuum in the marking chamber as described in detail below, this information is transmitted to the control mechanism 14 which, in a preferred embodiment, aborts the marking process until the situation is corrected, for example by inspecting for the cause of the failure and/or by bringing a fresh part 4 before the safety seal assembly 6 for marking.

The reasons for the failure to form the vacuum in the vacuum chamber may include, but certainly are not limited to such reasons as the part 4 is deformed, or is not in proper registration to form a side of the vacuum chamber, or has a defect in it such as a hole or other defect, or that the sealing portion of the sealing head assembly 12 is worn, cracked or is otherwise unable to form the seal that will allow for the creation of the vacuum in the vacuum chamber. Where a vacuum is also drawn in the marking chamber as explained below in connection with alternative embodiments of the present invention, these reasons would apply for the failure to form a vacuum in the marking chamber as well.

Whatever the reason, it is abundantly clear that one of the attributes of the present invention is that the part 4 will not be marked unless and until the vacuum chamber is formed with the part 4 forming one of the chamber's sides and holding the desired vacuum for the desired duration of time. Forming the proper vacuum in the vacuum chamber and also optionally but preferably in the marking chamber as well as is explained in detail below, not only ensures the portion of the part 4 that is being marked is properly registered and is not deformed or otherwise impaired, but also ensures that laser light in the vacuum/marking chamber will not escape the marking chamber. As used herein the term "registered" is synonymous with the concept of proper positioning of the part relative to the laser and the seal before the part is marked.

Other attributes of the present invention include that it eliminates the need for bulky foot-print consuming guards, shields and the like and reduces the need for protective or other clothing for the operator of the laser marking system and device 1 of the present invention.

As described in more detail below, the safety seal assembly 6 and/or the laser marking system and device 1 may also include a wide variety of additional sensors in addition to the proximity sensors described above. Such sensors include part presence sensors, material sensors such as but not limited to metallic sensors, non-metallic sensors, surface geometry sensors and the like. The present invention is not limited to the types, number or locations of such sensors, and such sensors may be employed as needed.

Metallic sensors can include for example sensors to sense the presence of aluminum, steel, ferrous materials and other metallic parts. Metallic sensors, for example, are particularly useful where the part 4 is a metal part. This ensures that other surfaces, such as glass or a human body are neither marked and/or neither allow laser light to pass there through to undesirably mark a surface that was not intended to be marked with the laser, even though a vacuum may have been able to form.

Non-metallic sensors can include optical sensors, for example.

With the basic operation of the laser marking system and device 1 described, the discussion now turns to a more detailed discussion of its component parts.

Figure 3:
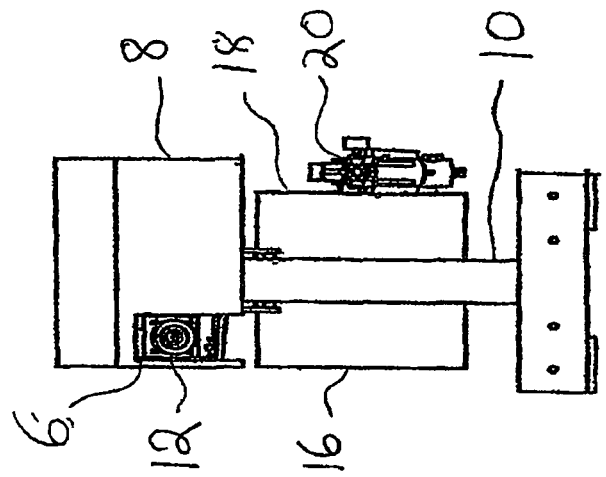
FIG. 3 is a perspective view of the laser marking system and device of FIG. 1 but without the part.
Figure 4:
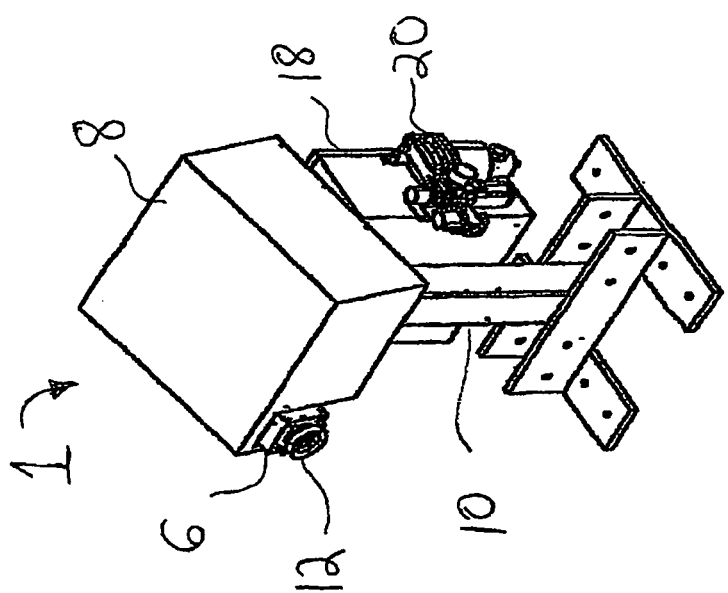
FIG. 4 is a front elevational view of the laser marking system and device of FIG. 3.
Figure 6:
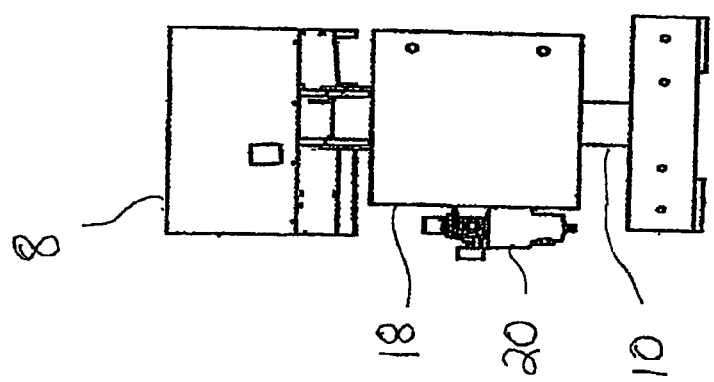
FIG. 6 is a rear elevational view of the laser marking system and device of FIG. 3.
Figure 5:
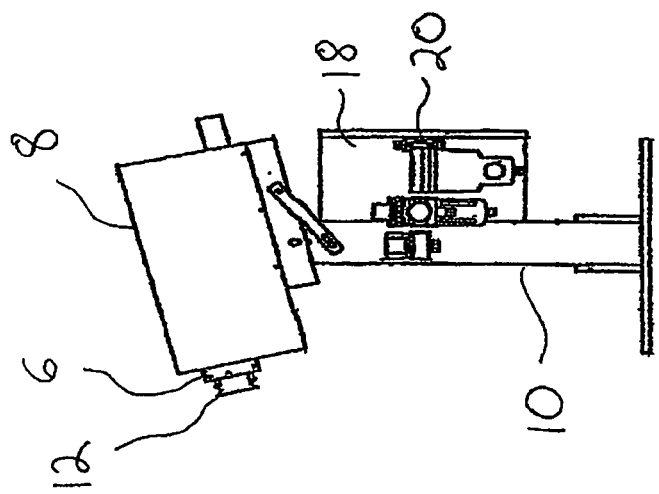
FIG. 5 is a side elevational view of the laser marking system and device of FIG. 3.

First, an examination of the device from several views are provided, with like parts bearing like reference numerals to those described above. FIG. 3 is a perspective view. FIG. 4 is a front elevational view. FIG. 5 is a side elevational view. FIG. 6 is a rear elevational view. FIG. 7 is a top plan view.

Referring now to FIG. 8, the cover 8 has been removed to reveal the components thereunder. Shown in FIG. 8 is laser generator 22 which generates the laser light. The laser light is then transferred to a rail assembly 24 via a fiber optic cable, not shown. The laser light is then guided via rail assembly 24 through the safety seal assembly 6 to mark the part 4 as discussed in more detail below. More particularly, safety seal assembly 6 includes sealing head assembly 12 which has aperture 25 therein through which the laser light traverses to mark the part 4. The sealing head assembly 12 is discussed in more detail below. Also illustrated in FIG. 8 is a slide assembly 26 for advancing and retracting the safety seal assembly 6 toward and away from, respectively, the part 4. The slide assembly illustrated in FIG. 8 is pneumatic, but as explained above, the present invention is not so limited and any mechanism which accomplishes the purpose of advancing the safety seal assembly 6 toward and away from the part 4 is within the scope of the present invention.

Also, as may be appreciated, the present invention is not limited to a slide mechanism either. As mentioned above, other systems, such as an arm (not shown) that not only advances the safety seal assembly 6 towards and away from the part 4, (e.g. along an x-axis), but can also move the safety seal assembly 6 along the part 4 (e.g. in a y-axis) and/or upwardly or downwardly (e.g. along a z-axis) and or rotationally about any one or more of these axes may be utilized as within the scope of the present invention.

Figure 9:
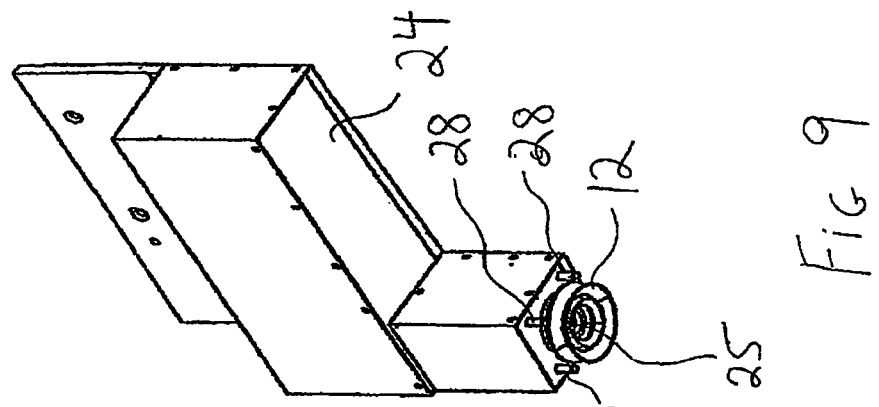
FIG. 9 is a perspective view of one embodiment of the rail assembly of the present invention.
Figure 11:
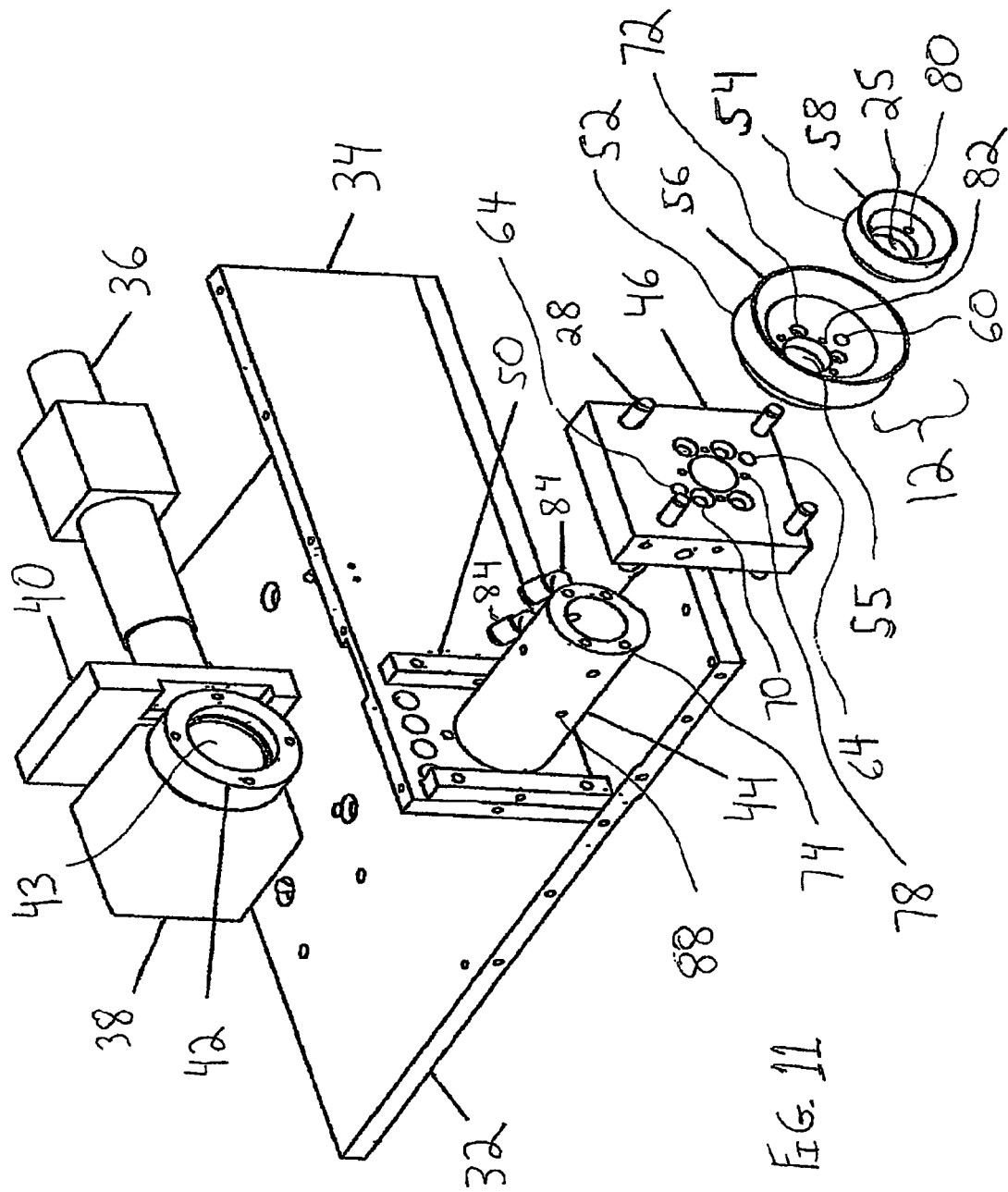
FIG. 11 is a perspective exploded view of the rail assembly of FIG. 10 illustrating the component parts of the rail assembly.

Referring now to FIG. 9 there is illustrated a perspective view of the rail 24. Shown in FIG. 9 is sealing head assembly 12 and aperture 25. Also illustrated in FIG. 9 are proximity switches 28. Although four of such proximity switches 28 are shown in FIGS. 9 and 11, as may be appreciated, the present invention is not limited to four of such switches and more or less may be utilized in accordance with the present invention.

It is also within the scope of the present invention that such switches may perform more than one function. For example, switches 28 may be provide both proximity switching and material sensing, e.g. metallic sensing, functions.

Figure 10:
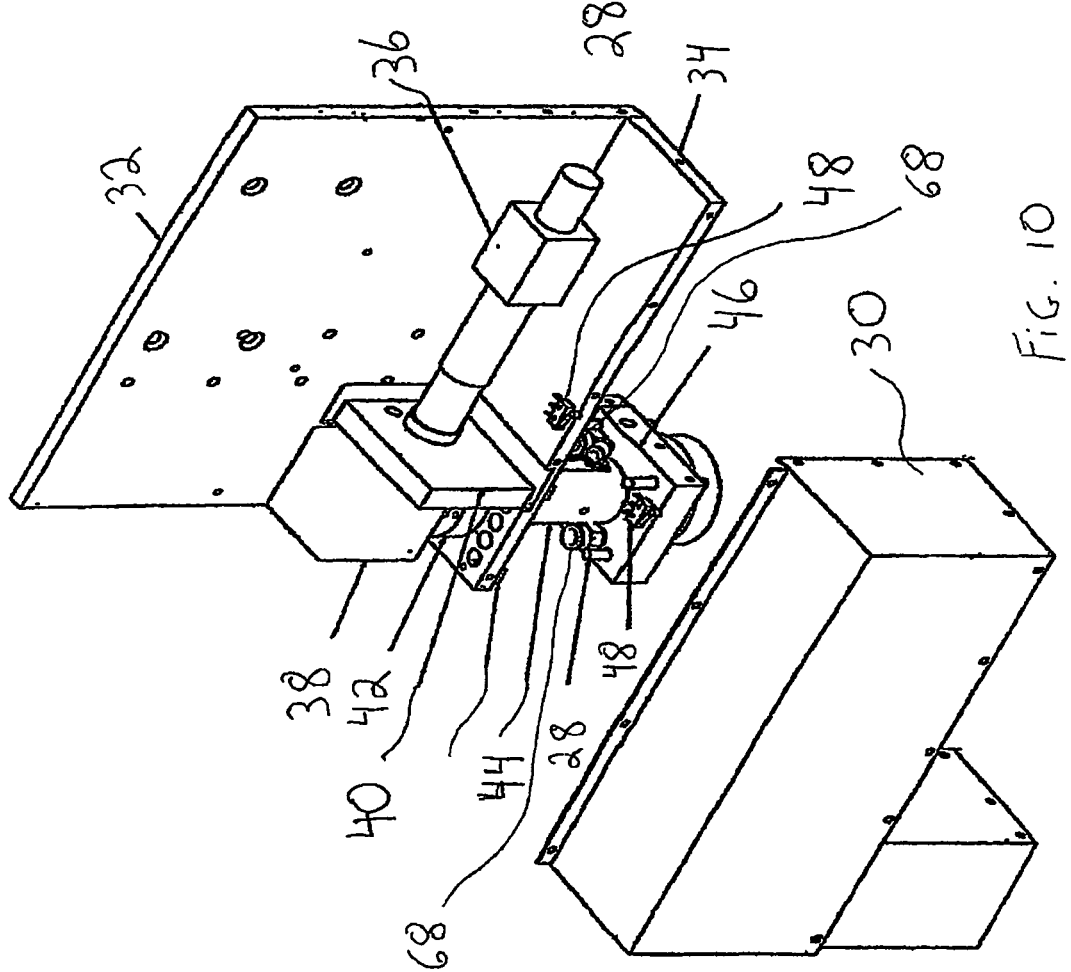
FIG. 10 is a perspective view of the rail assembly of FIG. 9, illustrating removal of the cover to show the internal components of the rail assembly.

FIG. 10 is a perspective exploded view of the rail assembly 24 showing the rail cover 30 removed to show the interior components of the rail assembly 24. Base plate 32 is shown upon which adapter plate 34 rests.

Supported by base plate 32 and adapter plate 34 is laser and optical isolator 36. Laser light exits the laser and optical isolator 36 whereupon it is aligned to the scan head 38.

Interposed between laser and optical isolator 36 and scan head 38 is a safety shutter assembly 40 which opens and closes as instructed by a safety circuit(s) which prevents activation of the laser under certain circumstances, such as when covers are not in place etc on the unit. In this case a 24 volt safety circuit is employed to sense when it is safe to activate the laser to allow laser light to enter scan head 38 when all safety mechanisms are satisfied such as part sensors, vacuum sensors, metallic sensors and the like. The scan head 38 is not limiting to the present invention and may include any scan head known in the art, but in a preferred embodiment it consists of a series of mirrors which are movable and operate to reflect the laser light as desired upon a desired path toward the aperture 25 and then to the part 4 for marking of the part 4. More particularly, laser light exiting the scan head 38 passes through lens ring 42 through lens 43, through laser tube 44 through vacuum adapter block 46 through aperture 25 in sealing head assembly 12 to the part 4 (not shown) being marked Also illustrated in FIG. 10 are safety switches 48 which sense when covers are in place or removed to prevent activation of the laser when such covers are removed.

FIG. 11 is a perspective exploded view of a portion of the rail assembly 24. Illustrated in FIG. 11 are again base plate 32 and adapter plate 34, laser and optical isolator 36, scan head 38, shutter assembly 40, lens ring 42, lens 43, laser tube 44, and vacuum adapter block 46 having proximity switches 28 thereon. Also illustrated in FIG. 11 is adapter plate 50.

Illustrated in FIG. 11 is sealing head assembly 12 and more particularly, the component parts that make up sealing head assembly 12. Sealing head assembly 12 includes outer vacuum cup 52 which generally concentrically surrounds inner vacuum cup 54. Inner vacuum cup 54 has aperture 25 therein which aligns with aperture 55 of outer vacuum cup 52. Laser light passes through apertures 55 and 25 to mark the part 4.

It is important to understand the operation and interoperation of laser tube 44, vacuum adapter block 46, outer vacuum cup 52 and inner vacuum cup 54 in the context of appreciating the present invention.

In the non-exploded view of FIG. 10 and from the exploded view of FIG. 11, it may be appreciated that when assembled, the inner vacuum cup 54 is nested within outer vacuum cup 52. The inner and outer vacuum cups 54 and 52 respectively may be made of a single material, such as rubber, or a composite of different materials such as metal, plastic, rubber and combinations thereof. In any event, it is important that the outer flange 56 of the outer vacuum cup 52 and the outer flange 58 of the inner vacuum cup 54 are made of a resilient material that when pressed against the part 4 will allow a seal to form to support the vacuum described herein.

Figure 12:
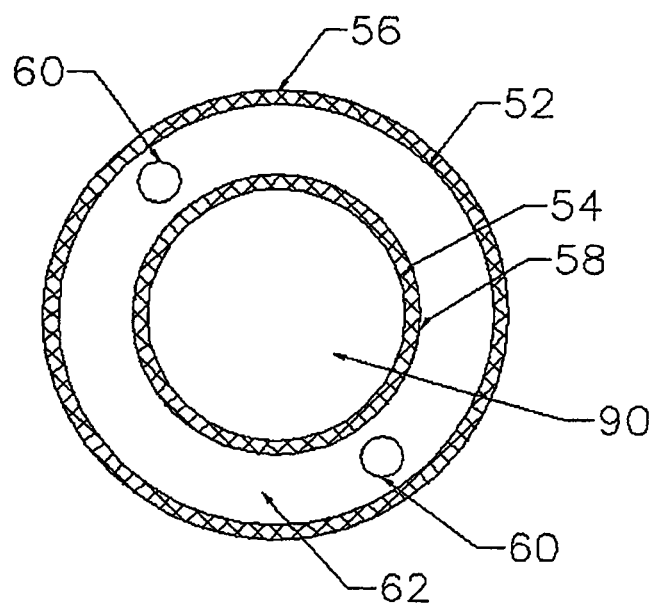
FIG. 12 is a front elevational view of the inner and outer vacuum cups of sealing head of the safety seal assembly of FIG. 11 illustrating the concentric relationship of the two and the vacuum chamber and marking chamber of the present invention.

Referring now to FIG. 12 there is shown a schematic elevational frontal view of the inner vacuum cup 54 nested within outer vacuum cup 52. The outer flange 56 of the outer vacuum cup 52 is shown as is the outer flange 58 of the inner vacuum cup 54. A plurality of holes 60 are shown in FIG. 12 through outer vacuum cup 54 that lead into the interstitial space 62 that exists between outer vacuum cup 52 and inner vacuum cup 54. It is through these holes that the vacuum is pulled to cause the interstitial space 62 between outer vacuum cup 52 and inner vacuum cup 54 to hold a vacuum when flanges 58 and 56 to form a seal against part 4, thus creating the vacuum chamber of the present invention. While two holes 60 are shown in FIG. 12, as may be appreciated the invention is not so limited, and any number of holes may be employed in any position to establish the vacuum.

As may be seen from at least FIG. 12, when the inner and outer vacuum cups 54 and 52 respectively are pressed against or at least brought in sealed contact with the part 4, the interstitial space 62 between the inner vacuum cup 54 and outer vacuum cup 52 and the part 4 together form the vacuum chamber, and the vacuum is drawn through holes 60.

We turn now to a discussion of the air and vacuum flow in the embodiment of the laser marking system and device illustrated in FIG. 11.

One of the holes 60 in outer vacuum cup 54 is visible and so marked in FIG. 11. The holes 60 are in alignment with and sealingly engage corresponding holes 64 in vacuum adapter block 46. Vacuum adapter block 46 has channels drilled therein to allow the vacuum to flow from holes 60 through vacuum block 46 to fittings 68 which may be seen in FIG. 10, through tubing not shown to vacuum assembly 18 where the vacuum is drawn and sensed. The precise location and number of the channels in the vacuum block 46 and holes 60 and 64 are not limiting to the present invention, and variations are within the scope of the present invention.

The mounting holes 70 should not cause confusion as they are simply mounting holes for a bolt or screw (not shown) to mount outer vacuum cup 52 through its holes 72 through holes 70 in vacuum block 46 and in turn to threaded holes 74 in laser tube 44. Similarly, holes 78 in vacuum block 46 are used to mount inner vacuum cup 54 via holes 80 with a bolt or screw (not shown) through holes 82 through outer vacuum cup 54 and into threaded holes 78 of vacuum adapter block 46.

The vacuum drawn through fittings 68 enables a vacuum to be drawn through vacuum adapter block 46 between inner vacuum cup 54 and outer vacuum cup 52, and when part 4 is pressed against them to create a vacuum chamber to hold such vacuum.

As noted above, the lasering process often creates fumes, debris and other by-products that are desirably captured and removed. Thus in a preferred embodiment, the present invention includes a fume extractor assembly to remove such by-products. Such a fume extractor assembly is shown in FIG. 11.

As shown in FIG. 11, when a suction is pulled (not the vacuum described above with regard to creating a vacuum chamber, but a separate suction line to capture fumes) through fittings 84 which are connected to through holes leading to the interior of laser tube 44, air flows into holes 88, which are similarly throughholes to the interior of laser tube 44, and the air flowing into the holes 88 through the interior of the laser tube 44 and out thorough fittings 84 create a venturi action to pull such by-products from the marking chamber 90. The marking chamber 90 may be seen in FIG. 12. The number and location of the holes 88 and/or the fittings 84 are not limiting to the present invention, provided they allow sufficient air flow through the laser tube 44 to support the venturi action needed to extract the by-products from the marking chamber. Once collected, such fume and by-products may be sent to a filter (not shown) or other capture device for treatment and/or disposal.

As may be readily appreciated, this arrangement provides several important attributes of the present invention. First, the vacuum formed in the interstitial space 62 sealingly engages the inner vacuum cup 54 and the outer vacuum cup 52 to the part 4 when the two are placed against the part 4, which part 4 forms the final side of the vacuum chamber when interstitial space 62 is made into a chamber by operation of part 4 being in physical contact with the sealing head assembly 12 to form the chamber. This vacuum can be measured and forms one of the key features of the present invention to know when the part 4 is in proper registration and does not have deformities, holes or other malformations in the area that is to be marked.

And in addition to forming the vacuum for the purposes set forth above, an additional benefit of the design of the present invention is that the vacuum also operates to assist in holding the laser marking system and device 1 of the present invention and the part 4 in sure and secure alignment with one another during the laser marking process, which helps to ensure clear crisp marks. Vibrations and other interfering relative motions are eliminated allowing the laser to make the desired mark in the desired location clearly, crisply and cleanly.

Still further, when the part 4 is present to provide the final side to marking chamber 90, and when the laser is activated to mark the part, as may be appreciated by those skilled in the art, the laser is clearly engaging, at least generally speaking, in a burning operation to mark the surface of the part 4. This burning operation creates gasses, debris and fumes that, in a preferred embodiment are captured and removed from the work site and treated accordingly.

Although the inner vacuum cup 54 and outer vacuum cup 52 have been illustrated herein as generally circular in shape, as may be appreciated, the present invention is not so limited. Square, rectangular, oval, triangular or any shape may be employed depending upon the required or desired shape of the marking chamber, and provided that interstitial space 62 is created and a seal can be provided when placed against the part 4 to be marked. And in addition to symmetrical shapes, the inner and outer vacuum cups can assume even irregular shapes as for example to accommodate irregularly shaped parts 4 to be marked. And the vacuum cups 54 and/or 52 may include one or more bellows or other mechanisms to add more flexibility and/or resiliency if needed to form their seal against the part 4, particularly if part 4 has an irregular surface.

It is particularly useful with the present invention that the surface of the part 4 being marked does not have to be a purely flat or planar surface. With sufficient design and resiliency, the outer flanges/sealing edges 56 and 58 will allow the sealing head assembly 12 to seal against very irregular surfaces indeed, provided the desired vacuum can be formed. Thus the present invention can accommodate irregularities in all three dimensions with regard to the part 4, as where for example it may have raised surfaces, corrugated surfaces, surface depressions and the like, provided the outer flanges 56 and 58 are designed to accommodate such variances and form the desired seal for the vacuum to be formed.

The present invention works reliably and well for many if not most operations.

However, where an added level of security is required and/or desired, in addition to providing a vacuum in the vacuum chamber to ensure part integrity and proper registration, a vacuum may also be provided in the marking chamber concurrently with, before or after formation of the vacuum in the vacuum chamber.

Figure 13:
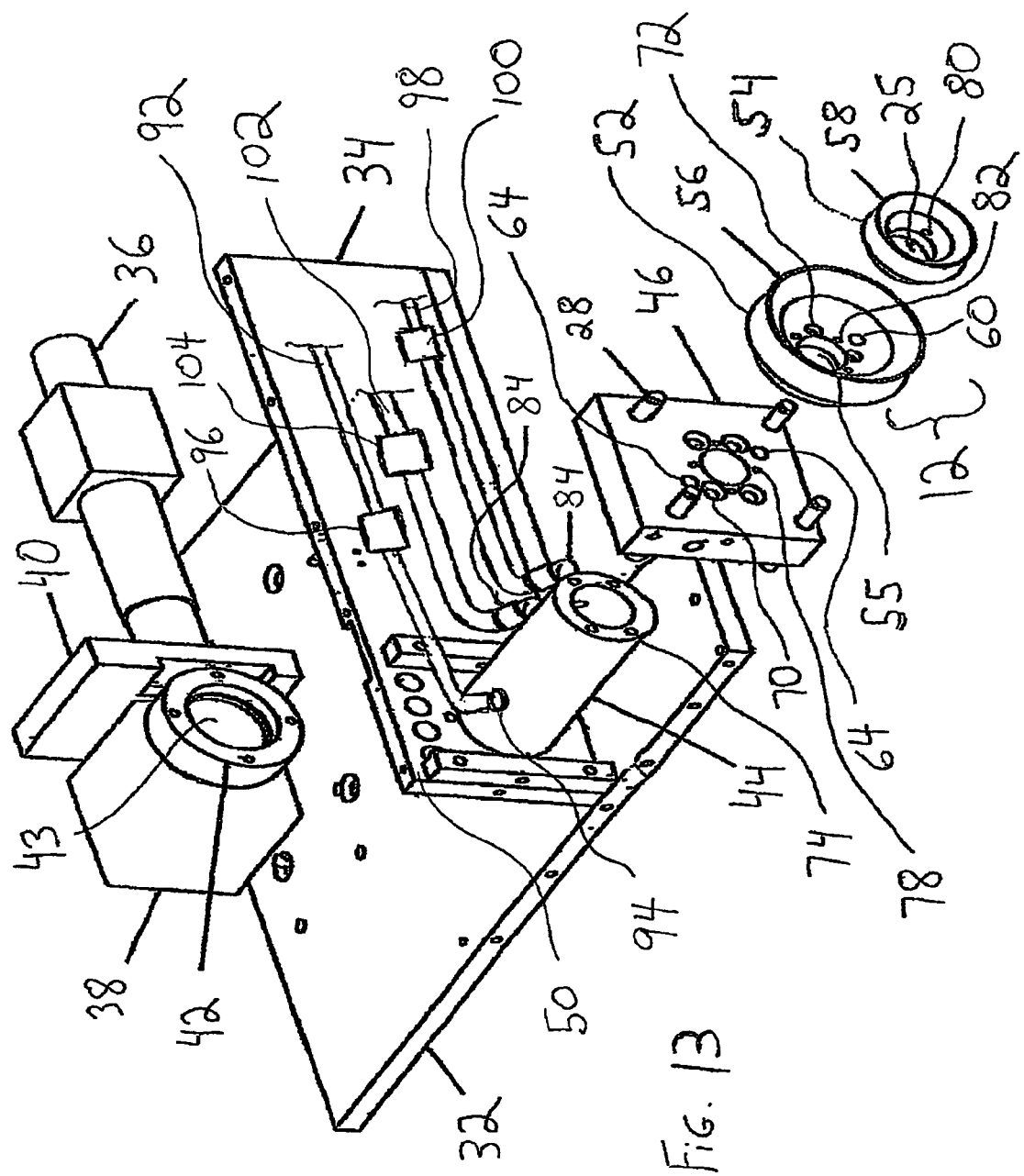
FIG. 13 is a perspective view of an alterative embodiment of the present invention that is similar to that of FIG. 11, but in which an additional vacuum line and valving are used to create a vacuum in the marking chamber.

In an alternative embodiment illustrated in FIG. 13, tube 44 no longer includes holes 88. It does include vacuum line 92 which is in communication with the interior of laser tube 44 through hole 94 at one end and the other end (not shown) is included in the vacuum assembly 18. The vacuum line 92 includes a valve 96 which is shown conceptually in FIG. 13. To one of the fittings 84 is connected an air inlet line 98 which also includes a valve 100 which is shown conceptually in FIG. 13. To the other of fittings 84 is connected a fume suction line 102 (an air outlet line) for fume extraction which in turn is connected to a valve 104, also shown schematically in FIG. 13. As may be appreciated, the number and positioning of vacuum lines 92, air inlet lines 98 and fume suction line 102 and their respective valves is not limiting to the present invention, and more or less may be employed to obtain the following goals.

In operation, where it is desired/required to have a vacuum in the marking chamber, as for example to verify the integrity of part 4 in the marking chamber, the valves 100 and 104 are closed, and a vacuum is pulled through vacuum line 92 with valve 96 open which is sensed by vacuum assembly 18, which in turn is communicated to control mechanism 14 for among other possible purposes, to confirm part integrity for example. After the vacuum in the marking chamber 90 has been sufficiently established for the intended purpose(s), the vacuum valve 96 on the vacuum line 92 is closed, and the valves 100 and 104 are opened to allow air to enter and leave the interior of laser tube 44, and the resulting venturi action along with the suction provided by fume suction line 102 operates to remove fumes, debris and other by-products generated during the laser marking process.

When to measure the vacuum in the marking chamber 90 and for how long are variables that may be selected by the operator of the laser marking system and device 1 of the present invention. And, whether to measure the vacuum only in the marking chamber 90, only in the vacuum chamber 62 or both, and if both, whether to measure it simultaneously, and if not simultaneously than in what sequence each is to be measure in are variables to be selected by the operator of the system in accordance with the goals of the particular marking process for a particular part.

Figures 16, 17:
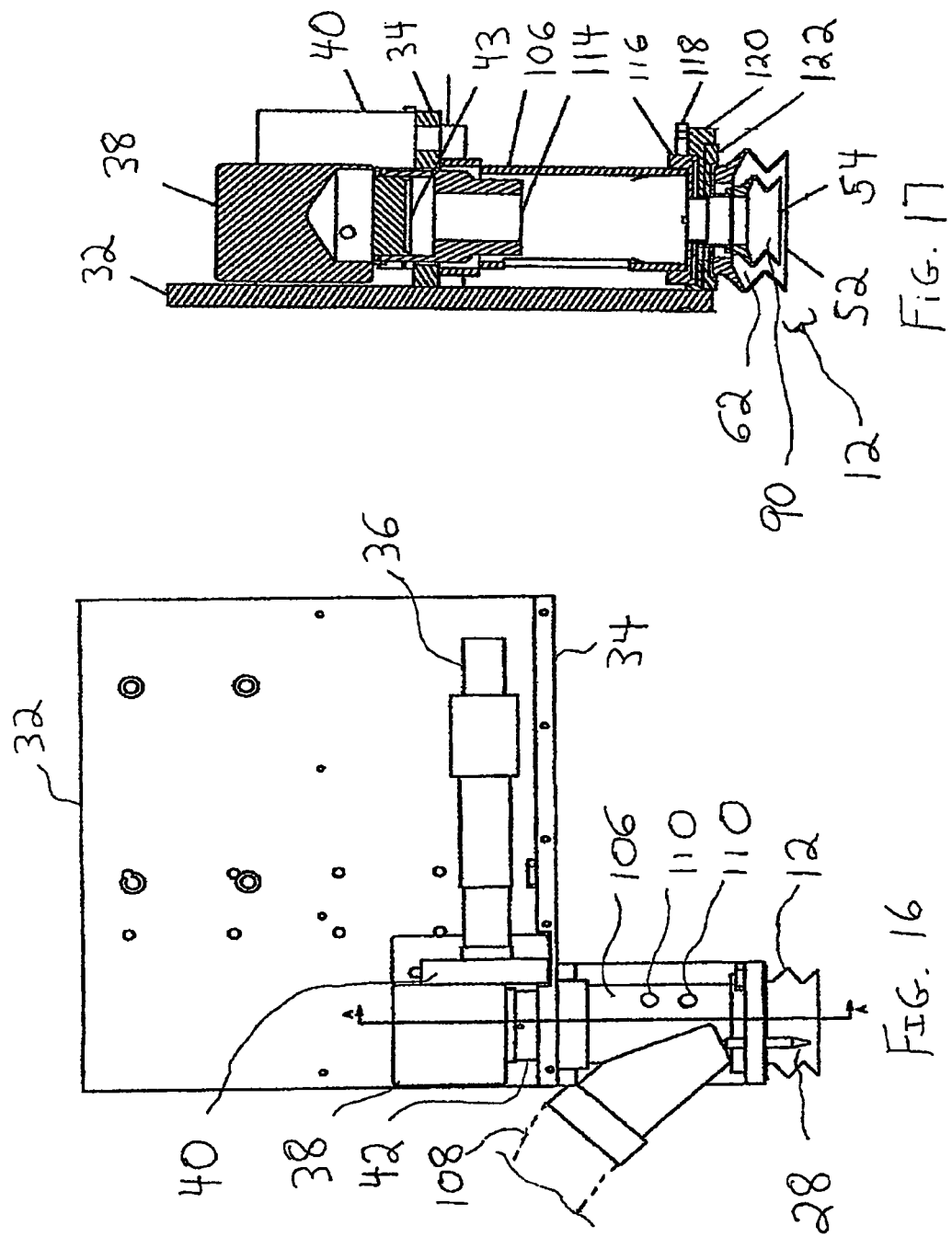
FIG. 16 is a top plan view of the rail assembly of FIG. 15.
FIG. 17 is a cross sectional view along the line A-A of FIG. 16.
Figure 18:
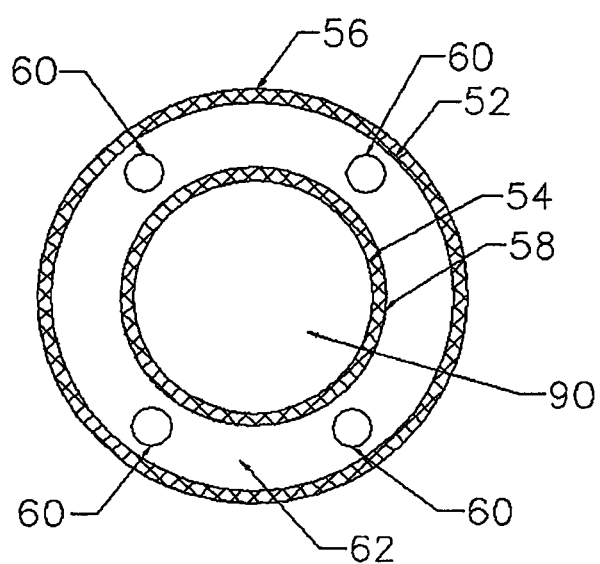
FIG. 18 is a front elevational view of the inner and outer vacuum cups of the embodiment of FIG. 14.

Referring now to FIGS. 14 through 18, there is shown yet another embodiment of the present invention. FIG. 14 is a perspective view of a rail 24 incorporating this alternative embodiment. FIG. 15 is a perspective view similar to that of FIG. 10, showing removal of the cover 30. FIG. 16 is a top plan view of the embodiment illustrated in FIG. 15. FIG. 17 is a cross sectional view along the line A-A of FIG. 16. FIG. 18 is a front elevational view of the sealing head 12 of this embodiment of the present invention. In FIGS. 14 through 18, like parts to that of FIG. 10 are labeled with the same reference numerals for convenience of understanding and reference.

In this embodiment, the laser tube has a markedly different design. As may be best seen in FIG. 16, laser tube 44 of the prior embodiments has been replaced with laser tube 106. Laser tube 106 has a Y-shaped design. The invention is not limited to the precise angle of the Y, and T's or other designs may be employed as within the scope of the present invention. The advantage of this design is that a larger suction hose, such as, for example, those approaching the size of standard shop vacuum machines may be affixed to the Y of laser tube 106. Such a hose is illustrated in FIG. 16 in phantom. In order to ensure adequate air flow into the laser tube 106 to allow the suction hose 108 to draw correctly, one or more air inlet holes 110 may be provided in laser tube 106.

In this embodiment, the vacuum adapter block 46 has been replaced with vacuum adapter block 112 which has four through-holes therethrough to which are connected four individual vacuum lines (not shown) to provide four holes 60 into the vacuum chamber 62 as shown in FIG. 18. Again, the present invention is not limited to four such holes 60 or to their exact placement, and more or less may be employed as within the scope of the present invention. In a preferred embodiment of the present invention, the four individual vacuum lines (not shown) may be threaded through suction hose 108, provided they are not in air or fluid communication with the interior of suction hose 108, as a convenient way to thread them back to vacuum assembly 18. Similarly, electrical or other lines associated with proximity switches 28 could be threaded through the interior of suction hose 108 as well. Also, shown in FIG. 17 is lens guard 114, vacuum adapter 116, cover safety switch 118, vacuum adapter 120, and cup adapter 122.

As with other embodiments discussed above, it may be useful to draw a vacuum in the marking chamber of the embodiment disclosed in FIGS. 14-18.

Figure 19:
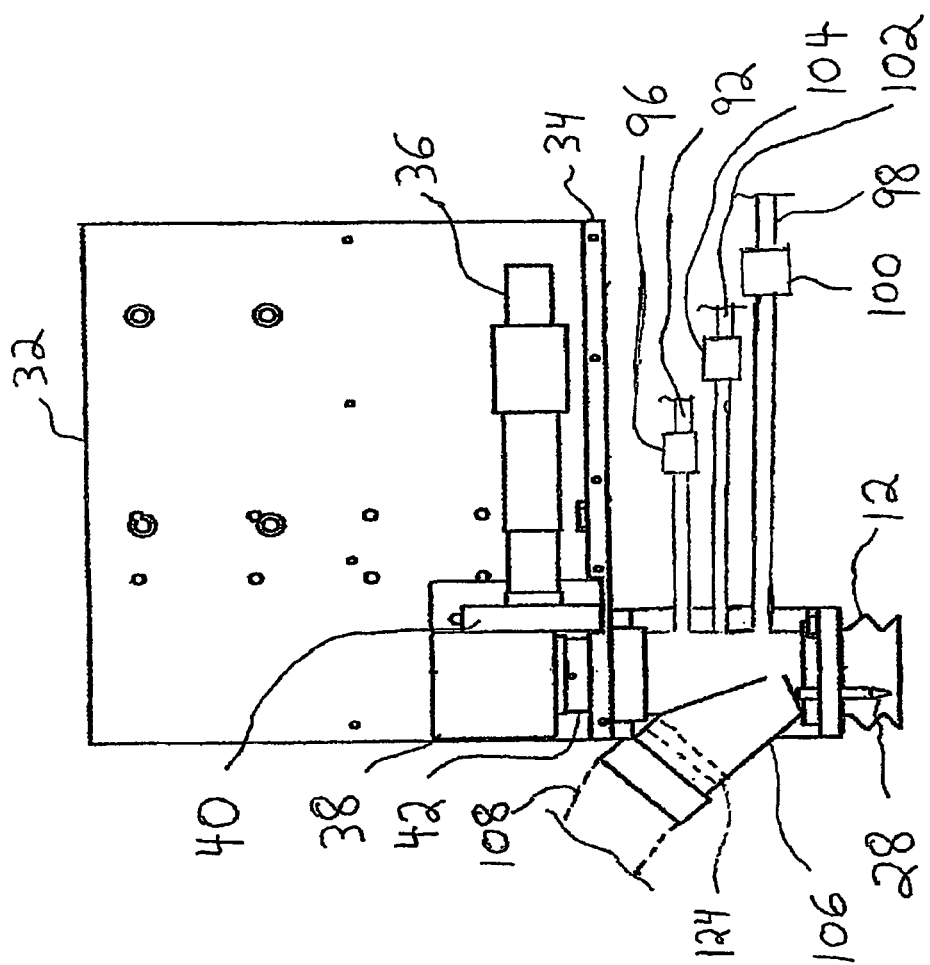
FIG. 19 is a top plan view of an alterative embodiment of the present invention that is similar to that of FIG. 14, but illustrating creating a vacuum in the marking chamber.

Therefore, an alternative embodiment is illustrated in FIG. 19, which is a top plan view similar to that of FIG. 16, but wherein a vacuum may be drawn in marking chamber 90. In this embodiment, laser tube 106 is no longer provided with air inlet holes 110, but similar to the embodiment shown in FIG. 13, it is equipped with vacuum line 92, having valve 96 and air inlet line 98 having valve 100 and fume suction line 102 having valve 104, shown schematically in FIG. 19. However, in this embodiment, in order to maintain a vacuum in this embodiment of the invention, this embodiment of laser tube 106 must be fitted with a valve 124, which is shown schematically and in phantom in FIG. 19.

In operation, where it is desired/required to have a vacuum in the marking chamber 90 of this embodiment, as for example to verify the integrity of part 4 in the marking chamber area, the valves 100, 104 and 124 are closed, and a vacuum is pulled through vacuum line 92 with valve 96 open, which vacuum line 92 extends to vacuum assembly 18 (not shown) which vacuum is sensed by vacuum assembly 18, which in turn is communicated to control mechanism 14 for among other possible purposes, to confirm part integrity for example. After the vacuum in the marking chamber 90 has been sufficiently established for the intended purpose(s) in this embodiment, the valve 96 on the vacuum line 92 is closed, and the valves 100, 104 and 124 are opened to allow air to enter the interior of the laser tube 106 through air inlet line 98 and leave the interior of laser tube 106 through flume suction line 102, and the resulting venturi action along with the suction provided by flume suction line 102 and/or suction provided by suction hose 108 operates to remove fumes, debris and other by-products generated during the laser marking process.

In yet a still more simple embodiment of the invention as illustrated in FIG. 20, the air inlet line 98 flume suction line 102 can be dispensed with in its entirety, and there is no corresponding opening for it in laser tube 106 in this embodiment. In this embodiment, when the vacuum is desired to be measured in the laser tube 106 and correspondingly in marking chamber 90 when part 4 is registered against inner vacuum cup 54, the valves 100 and 124 are closed and the valve 96 is open allowing vacuum to be pulled through vacuum line 92. After the vacuum has been confirmed as described above by vacuum assembly 18, the valve 96 is closed, and the valves 100 and 124 are opened, whereupon suction hose 108 can remove fumes, debris and other by-products formed during the laser marking process.

Again, as with the similar embodiment discussed above, for the embodiments illustrated in FIGS. 19 and 20, when to measure the vacuum in the marking chamber 90 and for how long are variables that may be selected by the operator of the laser marking system and device 1 of the present invention. And, whether to measure the vacuum only in the marking chamber 90, only in the vacuum chamber 62 or both, and if both, whether to measure it simultaneously, and if not simultaneously than in what sequence each is to be measure in are variables to be selected by the operator of the system in accordance with the goals of the particular marking process for a particular part.

It is also an embodiment of the present invention that one or more additional air inlet lines may be used with any of the foregoing embodiments, as for example, to provide a blast of cleaning air at or about the area of the marking chamber 90 to ensure that any stubborn debris is dislodged and removed.

Speaking generally across all of the embodiments of the present invention, it is not limiting to the invention that the safety seal assembly 6 is perpendicular to the laser and optical isolator 36. In fact, there are applications of the present invention, where it would be preferential to have a more linear design of the safety seal assembly and the laser and optical isolator 36, where the two are aligned along their longitudinal axis. Nor is it limiting that the laser and optical isolator extends to the right as one looks at the laser marking system and device of the present invention from the front. It could just as easily extend to the left or up or down, as desired/required. The arrangement of these items relative to each other is not limiting to the present invention.

Nor is the design of the stand 10 shown limiting to the invention, and other types of stands may be used as within the scope of the present invention.

Nor is the size of the unit limiting to the present invention. Larger and smaller units may be constructed for various purposes.

Continuing to speak generally now for all embodiments of the present invention, the vacuum level itself in the vacuum chamber and, where present, in the marking chamber, is not limiting to the present invention provided the functional goals described herein are met.

Similarly, the length of time to hold the vacuum in the vacuum chamber, and where present, the marking chamber as well, is not limiting to the invention, and may be as long or as short as desired or required to meet the objectives of the present invention. The vacuum may be held only long enough to ensure proper part registration and the lack of deformities, but it is preferred to hold the vacuum through the entire marking process to provide the desired seal during the marking process itself and to prevent the escape of any fumes or gasses etc. If the vacuum is to be held throughout the marking process, as may be appreciated, then the complexity of the mark, the nature of the materials being marked and other factors will determine how long the marking process must continue to obtain the desired mark. In general though, shorter durations are generally preferred though as it allows for faster throughput of parts through the system.

And even the vacuum itself is not limiting to the present invention, in that positive pressure alone or in combination with vacuum could be used to confirm proper part registration and lack of deformities etc in either or both of the vacuum or marking chambers. For example, a vacuum could be drawn in the vacuum chamber, while a positive pressure is applied in the marking chamber. Sensors measuring the vacuum in the vacuum chamber and sensors measuring the positive pressure in the marking chamber could be used then to confirm sealing and proper part registration for both chambers. And the present invention is not limited to this example either. As may be appreciated then, positive pressure might be applied in the "vacuum" chamber (which obviously might best be renamed in such an application) and a positive pressure might be applied in the marking chamber. Conversely, a positive pressure might be applied in the "vacuum" chamber while a vacuum is drawn in the marking chamber. Any other combination that still provides a mechanism to ensure part integrity and proper registration may be employed as within the scope of the present invention.

The intensity and types of laser radiation are not limiting to the invention, and may be any of those now known or later discovered in the art. Radiant energy produced by, but not limited to, optical power sources such as lasers, laser diodes, and direct diodes. The sun's radiant energy, properly filtered and focused, could make an acceptable radiant energy source. Gas lasers such as $CO_2$ lasers may be employed, as may solid state lasers such as diode pumped and flash lamp pumped lasers. Nd:YAG lasers may be employed for example. Lasers operating in continuous wave or pulsed mode may be used. See for example, U.S. Pat. No. 6,075,223 for a discussion of lasers generally, which is hereby incorporated herein in its entirety by reference. The wavelength (.lambda.) and output power (watts) of the optical power source are determined by the combination of the composition of the substrate material and the natural or enhanced energy absorbing characteristics of specific marking material to be applied In one embodiment of the present invention however, laser radiation generated by a diode pumped fiber having a wavelength of about 1064 nm and an intensity of about 20 watts was employed successfully with the present invention.

As indicated above, the type of mark is not limiting to the present invention. However, for certain applications, the type of mark can be of particular, even profound benefit. For example, in automotive production, where the mark is used to stamp a mark into the casing of the part, for example the housing of a transmission, the mark can be used to indicate the date and time of manufacture, the source of the parts being installed into the transmission and the like, so that at any time during the life of the transmission, its history can easily be known from the mark. This allows recall and correction to be limited to those units directly affected, whereas in the past, automobile manufacturers often had to include far too many units because such information was not available. For obvious reasons, any attempt to place such information on the housing of a part like a transmission case with a sticker or other paper product is problematic as such paper labels have a very limited lifetime in such arduous manufacturing and use conditions. Burning such information into the part with a laser so that the information is an integral item of the part removes such limitations. However, in order to obtain such a benefit, the laser marking system must be fast, accurate, extremely reliable in harsh manufacturing conditions, easy to install, easy to interface with other assembly line equipment, easy to operate, easy to repair, among other limitations, all of which are fully met with the laser marking system and device of the present invention. The mark itself may give such information, or it may be that the mark, in association with another device such as a bar code reader or database of serial numbers, provides such detailed information.

As may be appreciated, the applicability of the present invention is not limited to such an automotive application, which was selected only as an example, but is of value in any similar situation where having such information permanently lasered into one or more surfaces of a part or other component is required or desired.

Nor is the mark limited to marks of only useful nature as described above. It is fully within the scope of the present invention to include marks that are purely decorative or esthetic in nature. Also embraced within the scope of the present invention are marks which are both utilitarian and decorative in their nature and/or function.

Not shown, but fully anticipated within the scope of the present invention, is that the system may also include a mechanism, device or system to examine the mark so lasered into the surface of the part to confirm the mark was accurately made. Such inspection devices can include the human eye or may include instead or in combination therewith, automated, mechanical, computerized, cameras (digital or film), other digital and/or optical devices and/or other inspection devices as are known in the art, including combinations thereof.

EXAMPLE 1

A laser generator was used to generate a laser beam from a diode pumped fiber of the wavelength of about 1064 nm having an intensity of about 20 watts. A part, in this case an aluminum housing/case of an automotive transmission, was brought by a conveying line in front of the laser marking system and device of the present invention. The transmission case was stopped in front of the safety seal assembly for a total period of about 25 seconds. The safety seal assembly was advanced via a pneumatically activated slide towards the transmission case and made physical contact with the part, with forward advancement stopped when at least one proximity switch and the sealing head made contact with the surface of the transmission case to be marked. Upon making contact with the transmission case, the transmission case together with the inner vacuum cup formed the marking chamber, while the transmission case together with the inner and outer vacuum cups formed the vacuum chamber. A vacuum was drawn in the vacuum chamber to seal the sealing head to the transmission case. A suction and/or venturi, was obtained in the fume extractor assembly. Upon confirmation of the formation of the vacuum in the vacuum chamber with a vacuum sensor, a control mechanism provided laser light having the above described characteristics through the lens which burned a mark consisting of an alpha-numeric mark and a bar code into the transmission case. Gasses, fumes, debris and other by-products were pulled from the marking chamber by the suction and/or venturi action described above through the fume extractor assembly and were disposed of accordingly. Upon completion of the marking process, the vacuum was discontinued and the safety seal assembly and the part so marked were separated, and the safety seal assembly was retracted. The mark formed on the transmission case was inspected via visual inspection with the mark passing all required/desired parameters.

As may be appreciated, the present invention provides a laser marking device, system and method, which can reliably function in harsh environments and ensure accurate marking of the part or other item, which can tell when such part or other item is damaged or otherwise corrupted and/or when such part or item is not properly positioned for marking so that corrective steps can be taken, and which prevents the escape of light from the confined marking space, and which can be conveniently manufactured and is not unwieldy to operate or repair. It is particularly advantageous that the present invention provides such a laser marking system and device in a minimal footprint area. It is also an advantage of the present invention that while the environment in which the laser marking system and device may be operating, e.g. an automotive assembly line or other manufacturing facility, may be harsh, the marking chamber itself provides a reliably clean environment for marking the part via the marking chamber.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:
1. A laser marking system for marking a part, comprising:
   a laser;
   a marking chamber through which the light of said laser passes wherein at least a portion of at least one surface of a part to be marked forms one side of said marking chamber;
   a sealing head which includes a vacuum chamber surrounding said marking chamber, said vacuum chamber adapted to form a vacuum seal with the part to be marked with said laser, wherein at least a portion of at least one surface of the part to be marked forms one side of said vacuum chamber;
   a vacuum generation device adapted to provide a vacuum within said vacuum chamber when said surface of said part has formed said side of said vacuum chamber thereby sealing said vacuum chamber to said part;
   a vacuum sensor associated with said vacuum chamber to measure the vacuum within said vacuum chamber;

a control mechanism, said control mechanism activating said vacuum generation device and confirming a desired level of vacuum via input from said vacuum sensor and thereupon activating said laser to mark said part.

2. The laser marking system of claim 1 wherein said marking chamber further comprises an exhaust assembly adapted to remove gases, fumes and other debris formed during the laser marking process.

3. The laser marking system of claim 2 wherein said exhaust assembly operates via venturi action.

4. The laser marking system of claim 3 wherein the vacuum chamber is formed as an interstitial space between at least one inner vacuum cup and one outer vacuum cup and wherein said vacuum cups are spaced apart and are generally concentric with one another, said vacuum cups being capable of forming a seal with at least one surface of a part to be marked, and wherein said surface of said part and said interstitial space form said vacuum chamber wherein said vacuum chamber can hold a vacuum when a vacuum is applied to said interstitial space.

5. The laser marking system of claim 4 wherein each of said vacuum cups have at least one aperture therethrough for passing the light of said laser therethrough, with the apertures of each of said vacuum cups being generally aligned with one another to permit the passage of said laser light therethrough.

6. The laser marking system of claim 5 wherein the control mechanism includes a device for directing the laser to make the desired mark.

7. The laser marking system of claim 6 wherein said control mechanism includes a device for releasing the vacuum after the part has been marked.

8. The laser marking system of claim 7 further including a device for activating the exhaust assembly.

9. The laser marking system of claim 1 wherein said vacuum forms only when the part is not damaged and is properly registered.

10. The laser marking system of claim 1 further comprising a safety seal assembly for advancing and retracting the sealing head.

11. The laser marking system of claim 10 wherein the control mechanism also controls the movement of the safety seal assembly.

12. The laser marking system of claim 1 wherein said marking chamber further comprises a vacuum generation device adapted to provide a vacuum within said marking chamber when said surface of said part has formed said side of said marking chamber thereby sealing said marking chamber to said part;
a vacuum sensor associated with said marking chamber to measure the vacuum within said vacuum chamber; and
a control mechanism, said control mechanism activating said vacuum generation device and confirming a desired level of vacuum via input from said marking chamber vacuum sensor and thereupon activating said laser to mark said part.

13. The laser marking system of claim 1 wherein when said vacuum seal is formed, said laser marking system and said part form a monolithic stable structure that prevents relative movement between said laser marking system and said part, whereupon clear crisp marking is obtained.

* * * * *